US007764871B2

(12) United States Patent
Rodegher

(10) Patent No.: US 7,764,871 B2
(45) Date of Patent: Jul. 27, 2010

(54) INFRARED HEAT IRRADIATING DEVICE

(75) Inventor: Roberto Rodegher, Noverasco (IT)

(73) Assignee: Star Progetti Tecnologie Applicate, Milan (IT)

( * ) Notice: Subject to any disclaimer, the term of this patent is extended or adjusted under 35 U.S.C. 154(b) by 171 days.

(21) Appl. No.: 11/878,521

(22) Filed: Jul. 25, 2007

(65) Prior Publication Data

US 2008/0056693 A1 Mar. 6, 2008

(30) Foreign Application Priority Data

Aug. 29, 2006 (IT) .......................... MI2006A1648

(51) Int. Cl.
*A21B 2/00* (2006.01)

(52) U.S. Cl. ........................ 392/416; 392/501; 219/538

(58) Field of Classification Search ...................... None
See application file for complete search history.

(56) References Cited

U.S. PATENT DOCUMENTS 2,159,794 A * 5/1939 Hagen et al. ................ 313/578
2,731,610 A * 1/1956 Thacker ...................... 439/321
2,958,723 A * 11/1960 Logan et al. .............. 174/84 C
3,015,683 A * 1/1962 O'Keefe et al. ........... 174/84 C
3,137,925 A * 6/1964 Wahl .......................... 29/873
3,443,144 A * 5/1969 Freese, Jr. ................... 313/315
3,445,713 A * 5/1969 Cardwell, Jr. ............... 313/273
3,555,338 A * 1/1971 Scoledge et al. ............ 313/113
3,579,021 A * 5/1971 Kimball ....................... 313/274
3,617,797 A * 11/1971 Meijer et al. ........... 313/318.12
3,634,722 A * 1/1972 Palmer et al. ............... 313/279
3,678,319 A * 7/1972 Notelteirs et al. ........... 313/271
3,736,455 A * 5/1973 Notelteirs et al. ........... 313/274
3,780,328 A * 12/1973 Boddy et al. ................ 313/579
3,909,653 A * 9/1975 Bottone et al. .............. 313/271
3,936,124 A * 2/1976 Tuttle et al. ................. 439/279
4,080,548 A * 3/1978 Johnson ....................... 315/68
4,133,735 A * 1/1979 Afromowitz et al. ......... 204/406
4,214,802 A * 7/1980 Otani et al. ................. 439/275
4,442,374 A * 4/1984 Morris et al. ............... 313/316
4,698,027 A * 10/1987 Vandame .................... 439/271
4,710,676 A * 12/1987 Morris et al. ............... 313/579
5,315,065 A * 5/1994 O'Donovan ............... 174/84 C
5,386,356 A * 1/1995 Davis et al. ................. 362/267
5,962,973 A * 10/1999 Rice ........................... 313/580
6,022,237 A * 2/2000 Esh ............................ 439/348
6,031,213 A * 2/2000 Hashimoto et al. .......... 219/541
6,053,623 A * 4/2000 Jones et al. ................. 362/310
6,325,651 B1 * 12/2001 Nishihara et al. ........... 439/232
6,638,088 B1 * 10/2003 Richardson ................. 439/242
6,824,302 B2 * 11/2004 Akizuki et al. .............. 362/546
7,147,359 B2 * 12/2006 Ranish et al. ............... 362/652
7,471,885 B2 * 12/2008 Mizukawa et al. .......... 392/407
2004/0190289 A1 * 9/2004 Liu ........................... 362/226
2006/0197454 A1 * 9/2006 Mizukawa et al. ............ 315/46
2008/0247187 A1 * 10/2008 Kolstee et al. .............. 362/545

* cited by examiner

*Primary Examiner*—Thor S Campbell
(74) *Attorney, Agent, or Firm*—Nixon & Vanderhye PC

(57) ABSTRACT

An infrared irradiating device (1) comprising:

a lamp-holder of a material adapted to withstand the thermal and mechanical stresses to which it is exposed in the conditions of use and adapted to house an irradiating system, an infrared bulb (2) inserted in the lamp-holder (20) and able to produces radiations in the infrared wavelength, connector elements (15) at the ends of said infrared bulb (2), adapted to connect them to complementary connector elements (14) which carry an electrical supply cable (26) and further comprising means (10) to protect a connector element assembly (21) from infiltrations of water and from other external agents.

9 Claims, 3 Drawing Sheets

10
10'
10"
15
21
8
7
4
3
2
6
26
12
9
5
2'
14
11

INFRARED HEAT IRRADIATING DEVICE

The present invention refers to a device for irradiating heat by means of an infrared bulb able to transmit radiations in the infrared wave length (thus typically between 700 nm and 1 mm), provided with particular arrangements as to allow a high transmission of the heat, avoiding loss due to the absorption and to the reflection of the emitted waves. This device, furthermore, is provided with systems that ensure the water-tightness in case of an exposure of said irradiating device in an outdoor environment.

Irradiating devices that fulfil the function of irradiating a certain amount of heat onto a certain surface or into a certain area are known on the market. Such devices comprise a cover of a material adapted to withstand both the thermal stresses and the stresses due to the environment in which it is immersed, thus able to withstand high temperatures and having a low heat transmission coefficient.

Furthermore, in order to maximise the thermal yield of the lamp, the devices of the prior art do not have a glass to cover and to protect the infrared bulb. Being outdoor devices, it can happen that they are struck by jets of water or, more generally, by outdoor agents. This leads to the need to ensure the water-tightness of the electrical connections of the infrared bulb to the body of the lamp. This tightness is obtained either by covering the ends that enclose the connections of the infrared bulb to the electrical cables with hoods of silicone material, or by means of special watertight chambers which serve the same purpose as the hoods, though they are more complex to produce. In the case of silicone hoods, because of the connector elements used to connect the wire of the infrared bulb to a phase of the supply cable, which are nothing but electrical terminals, it is necessary at the same time to ensure an equally effective water-tightness of the end covers of the lamp-holder through a system of sealing O-rings embedded in said cover.

In the case of the watertight chambers, on the other hand, said chambers enclose the electrical terminals and, more generically, the connector elements, therefore they ensure tightness, which obviously is not sufficient, since it is not infrequent to find side seals also, although of much simpler design than the cover-gasket systems.

The devices of the prior art present a series of drawbacks:

- an increase both in production costs and in structural complexity since it is necessary to form the seats for said sealing O-rings in the edges of the covers;
- a low performance in terms of the ratio between the power consumption and the thermal yield since both the covering silicone hoods and the watertight chambers placed at the end of the infrared bulb protect the electrical connection from seepage but do not sufficiently withstand the temperature generated by said infrared bulb, giving rise to phenomena of crystallization of the silicone material of which they are made. For this reason, the end of the incandescent wire must be kept at a safe distance from said ends of the infrared bulb; that is, it is not possible for the incandescent wire to be of the same length as the infrared bulb. Because of this, there is obviously a loss of performance in terms of the ratio between energy consumption and actual thermal yield since at each end of the infrared bulb there will be a portion or a section of bulb that must have a lower temperature in order to avoid overheating of said silicone hoods or of said watertight chambers, depending upon the application considered, situated at the end.

It is not possible, therefore, to exploit the whole length of an infrared bulb, but only its length after deduction of a portion which represents the safe distance of the filament from the edges so that it does not have a harmful effect on the connector element assembly, with a consequent loss of irradiating efficiency and an increase in the overall dimensions. Instead, it would be desirable to have a device able to exert all its irradiating power without causing damage to the electrical connections, which could therefore damage the infrared bulb, the lamp-holder and even the electrical system to which said device is connected.

Lastly, another drawback that is encountered on lamp-holders of the prior art, is that the operation of replacing the infrared bulb proves to be very delicate and complicated (because of the type of assembly, it is necessary to dismantle the lamp-holder completely). Furthermore, a great care must be taken to avoid damaging the end connections of the bulb; since the cost of the infrared bulb is rather high, this suggests that the operation should preferably be carried out by specialized technicians.

Object of the present invention is to overcome the drawbacks of the prior art, by providing an irradiating device with a high thermal yield.

Another object of the present invention is to provide a type of connection to the ends of the infrared bulb capable of withstanding the high temperature generated by the infrared bulb.

Another object of the present invention is to provide an irradiation device that is watertight and able to absorb vibrations and small knocks.

A further object of the present invention is to provide an economical irradiation device whose maintenance is easy and within the ability of any user.

These objects are achieved in accordance with the invention with the characteristics listed in the appended independent claim 1.

Advantageous embodiments of the invention are apparent from the dependent claims.

Object of the present invention is an infrared irradiating device comprising:

- a lamp-holder of a material adapted to withstand the thermal and mechanical stresses to which it is exposed in conditions of use;
- an infrared bulb inserted in the lamp-holder and adapted to produce radiations in the infrared wavelength;
- connector elements at the ends of said infrared bulb adapted to connect them to complementary connector elements which carry an electrical supply cable; and
- means adapted to protect said connector elements from infiltrations of water and from other outside agents.

Through the use of a sheath protecting the connector elements, consisting of a special silicone material, called MG7203N40, the infrared bulb used in the present invention ensures a considerable increase in the thermal power of the irradiating device since it does not have end portions at an appreciably lower temperature than its central portion (the prior art suggests a distance of the filament from the end of the infrared bulb of about 25 mm).

This special silicone material has additives, in terms of plastic mixtures, which provide particular qualities of heat resistance. The material of which said sheath is made thus ensures an excellent resistance to high temperatures, avoiding the crystallization phenomenon common to most commercially available silicone when it is subjected to strong thermal stresses. The infrared irradiating device forming the subject matter of the present invention is thus able to use incandescent bulbs which have an incandescent filament for the whole length of the glass tube, thus avoiding cold portions which, overall dimensions being equal, cause losses in terms of thermal yield.

This sheath, furthermore, completely covers the area of the connector elements connecting the infrared bulb to the electrical cables, allowing the coupling thus achieved to ensure the required waterproofing qualities.

In one of the preferred embodiments of this invention, the infrared bulb is connected at each of its ends to a cylindrical sector in ceramic material, which in turn is connected to an electrical conductor cable fixed to a cable terminal which will, in the last analysis, be connected to a phase of the supply cable.

In another preferred embodiment of the present invention, the infrared bulb has at its ends a cable terminal, which for a part of its length is embedded in the glass body of the infrared bulb, and for another part is left exposed to allow the connection to the cable terminals present in the supply cable.

In another preferred embodiment of the present invention, the infrared bulb has at its ends a straight, rigid metal rod, to which a cable terminal able to be connected to a phase of the supply cable is fixed by means of a suitable firm fixing method such as heat welding or mechanical riveting, for example.

In each of the above described embodiments, the connecting system thus obtained is then covered with a sheath of a special silicone material adapted to protect the connection assembly from infiltrations of water and of dust and at the same time to ensure a flexible connection able to absorb the vibrations and the small knocks deriving from the use in an outdoor environment.

Such an infrared irradiation device produced according to the present invention holds a series of advantages with respect to the commercially available devices of the prior art:

- lower cost and easier production;
- greater thermal yield with the same size of the infrared bulb;
- greater ease of dismantling for the maintenance and/or for the replacement of the infrared bulb;
- elastic and anti-vibration connection of the infrared bulb to the lamp-holder; and
- complete sealing of the device against external agents such as water and dust.

Further characteristics of the invention will be made clearer by the detailed description that follows, referring to a purely exemplifying and therefore non-limiting embodiment thereof, illustrated in the appended drawings, in which.

Figures 1, 1A, 2, 2A, 3, 3A:
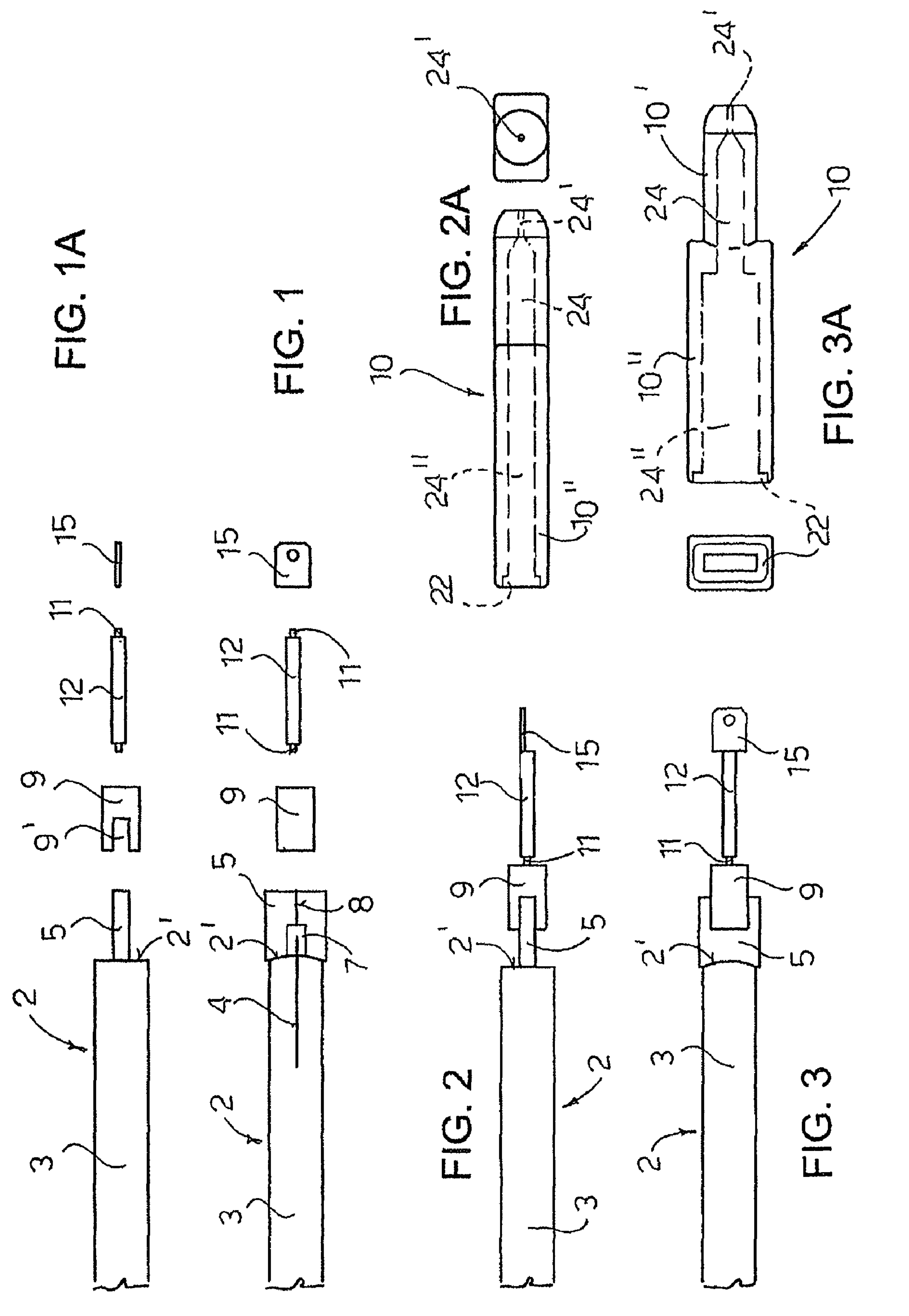
FIG. 1 shows an exploded plan view of an end of an infrared bulb complete with connector elements in accordance with a first embodiment of the invention.
FIG. 1A shows an exploded side view of the end of the infrared bulb of FIG. 1.
FIG. 2 shows an overall side view of the elements of FIG. 1A.
FIG. 2A shows a side view and an end view from the right of a protective sheath during the application to the end of the bulb of FIG. 2.
FIG. 3 shows an overall plan view of the elements of FIG. 1.
FIG. 3A shows a plan view and an end view from the left of the protective sheath of FIG. 2A, during the application on the end of the bulb of FIG. 3.

FIG. 1 shows a first embodiment of the present invention which comprises an infrared bulb 2 consisting of a glass tube 3 which closes on its inside (shown with a dashed line in the figure) a filament 4 adapted to become incandescent through the Joule effect and to irradiate at the infrared wavelength, made of a known material for this type of infrared bulb. At each of its two ends (only one visible in the figure), the glass tube 3 is flattened until it forms a substantially flat portion 5, thick enough to ensure an adequate support for said bulb and to allow a molybdenum plate 7, of the type known for infrared bulbs, to be embedded therein. Connected to said plate 7 is an electric cable 8, which is connected internally to a cylinder 9 of ceramic material heat welded to each flat end 5 of the infrared bulb 2. There departs from said cylinder of ceramic material 9 an electrical cable 11, covered by a sheath 12, to which is fixed at its opposite end, by welding, a flat male faston-type cable terminal 15, adapted to be connected to a complementary female faston-type terminal 14, to which is connected in turn a phase of the supply cable 26 (see FIG. 4).

Obviously the male and female cable terminals can be reversed with respect to what is illustrated in the figures.

As shown better in FIG. 1A, the ceramic cylinder 9 has a groove 9' adapted to be inserted into the flat portion 5 at the end of the glass tube 3 of the infrared bulb 2, whilst the connector element 15 has a substantially flat shape.

As can be seen in FIG. 3, each connector element described in FIGS. 1 and 1A is firmly fixed in sequence to the glass tube 3 of the infrared bulb 2.

As shown in FIG. 2A, the connector elements are finally covered with a sheath 10, of special silicone material which inside it houses a female faston-type connector element 14 (not shown in the figure) connected to the cable 26 carrying an electrical phase of the supply cable. The set of connector elements (9, 11, 12, 14, 15) forms a connector element assembly 21, which is then protected by the sheath 10.

As shown better in FIG. 3A this sheath 10 has a hollow cylindrical portion 10' provided with a circular axial through channel 24, of such a size as to allow the passage of the electrical phase of the supply cable 26 of the irradiating device 1. The channel 24 has a narrowing 24' in the terminal part of its cylindrical section 10' adapted to allow a tight seal of the sheath in the terminal portion. Attached to said cylindrical portion, there is a substantially rectangular parallelepiped-shaped section 10", inside which extends the channel 24 which becomes rectangular in shape in its section 24" as can be seen in the front view of FIG. 3A.

Referring again to FIG. 2A, the section 24" has a widened part 22 adapted to fit on the flat end 5 of the infrared bulb 2, so as to enclose completely the connector element assembly 21 and to ensure the water-tightness of the device 1.

Figures 4, 4A, 5, 6:
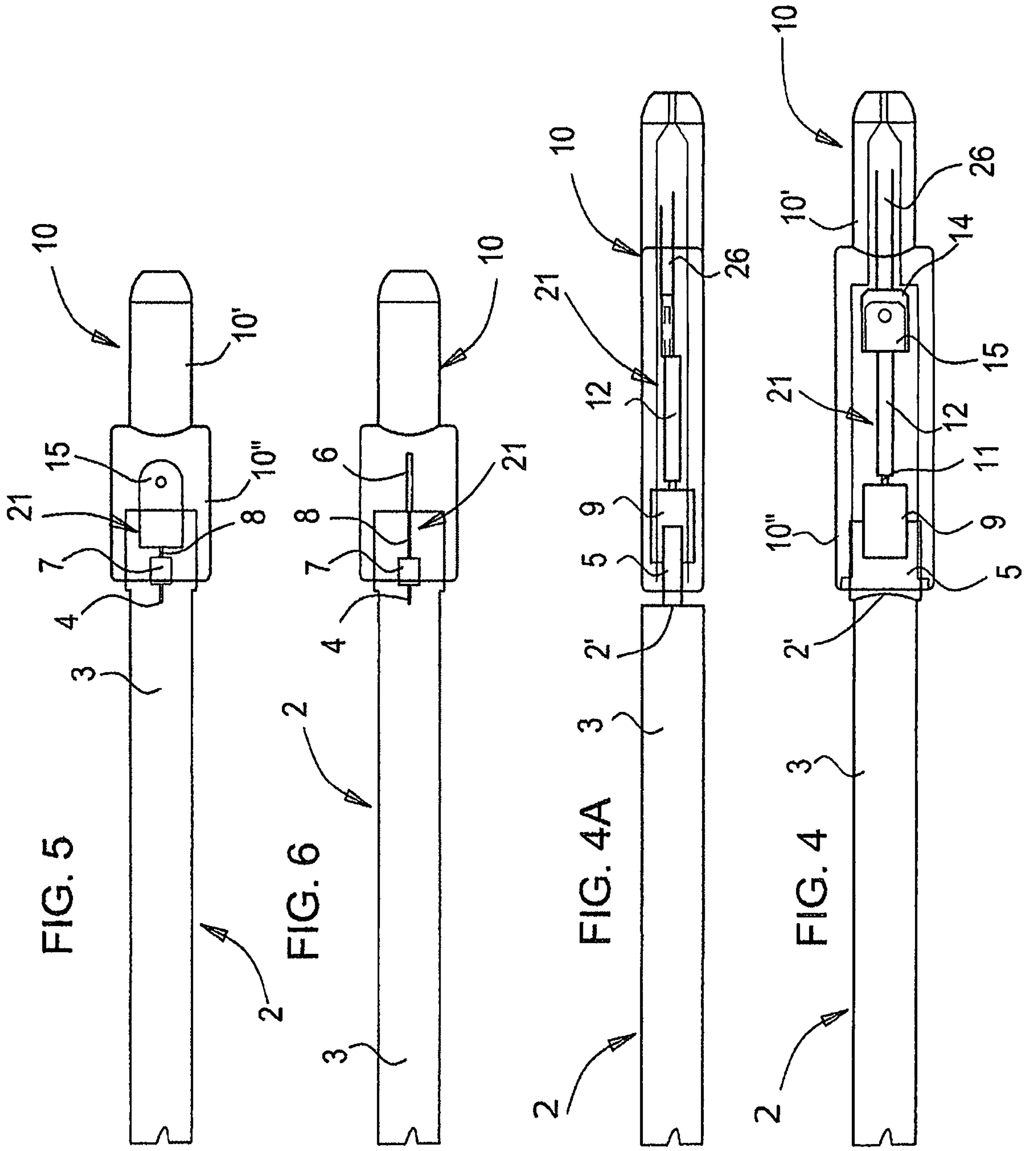
FIG. 4 shows a plan view of the end of the bulb of FIG. 3 with the sheath of FIG. 3A mounted.
FIG. 4A shows a side view of the end of the bulb of FIG. 2 with the sheath of FIG. 2A mounted.
FIG. 5 shows a plan view of the end of an infrared bulb complete with connector elements, with the sheath mounted according to a second embodiment of the invention.
FIG. 6 shows a plan view of the end of an infrared bulb complete with connector elements, with the sheath mounted according to a third embodiment of the invention.

In fact, as shown in FIGS. 4 and 4A, according to the embodiment described with reference to FIGS. 1-3, adapted to obtain the connection between the infrared bulb 2 and the supply cable 26, the sheath 10 encloses the connector element assembly 21, fitting on, and possibly undergoing, a slight deformation (not shown in the figures) in the area 10" following the forcing of the end 5 of the glass tube 3 so as to ensure said water-tightness.

FIGS. 5 and 6 show a second and a third embodiment of the present invention, respectively, in which like or corresponding elements to those already described in the first embodiment thereof are indicated with the same reference numerals and are not described in detail.

As shown better in FIG. 5, each of the ends 5 of the glass tube 3 of the bulb 2 comprises a cable terminal 15, half of which is embedded in the flat portion 5 and half of which protrudes therefrom, so as to be able to allow the connection thereof with a complementary cable terminal 14 forming a more simplified connector element assembly 21 than that in the embodiment previously described. Said connector element assembly 21 is then covered with a sheath 10 with a similar structure to the preceding one, which fits on each end of the glass tube 3 of the infrared bulb 2, possibly being slightly deformed in the portion 10", as described above, and allowing the required water-tightness.

FIG. 6 shows a third embodiment of the present invention in which each end 5 of the bulb 2 comprises a metal rod 6 of such a size and thickness as to make it rigid and straight, adapted to fix firmly a cable terminal 15, for example through welding or mechanical riveting, so as to be able to allow the connection thereof to a complementary cable terminal 14, in this case also forming a more simplified connector element assembly 21 than that of the above described first embodiment; in an entirely similar manner to that of the preceding two embodiments, the sheath 10 fits on each end to provide the required water-tightness.

Figure 7:
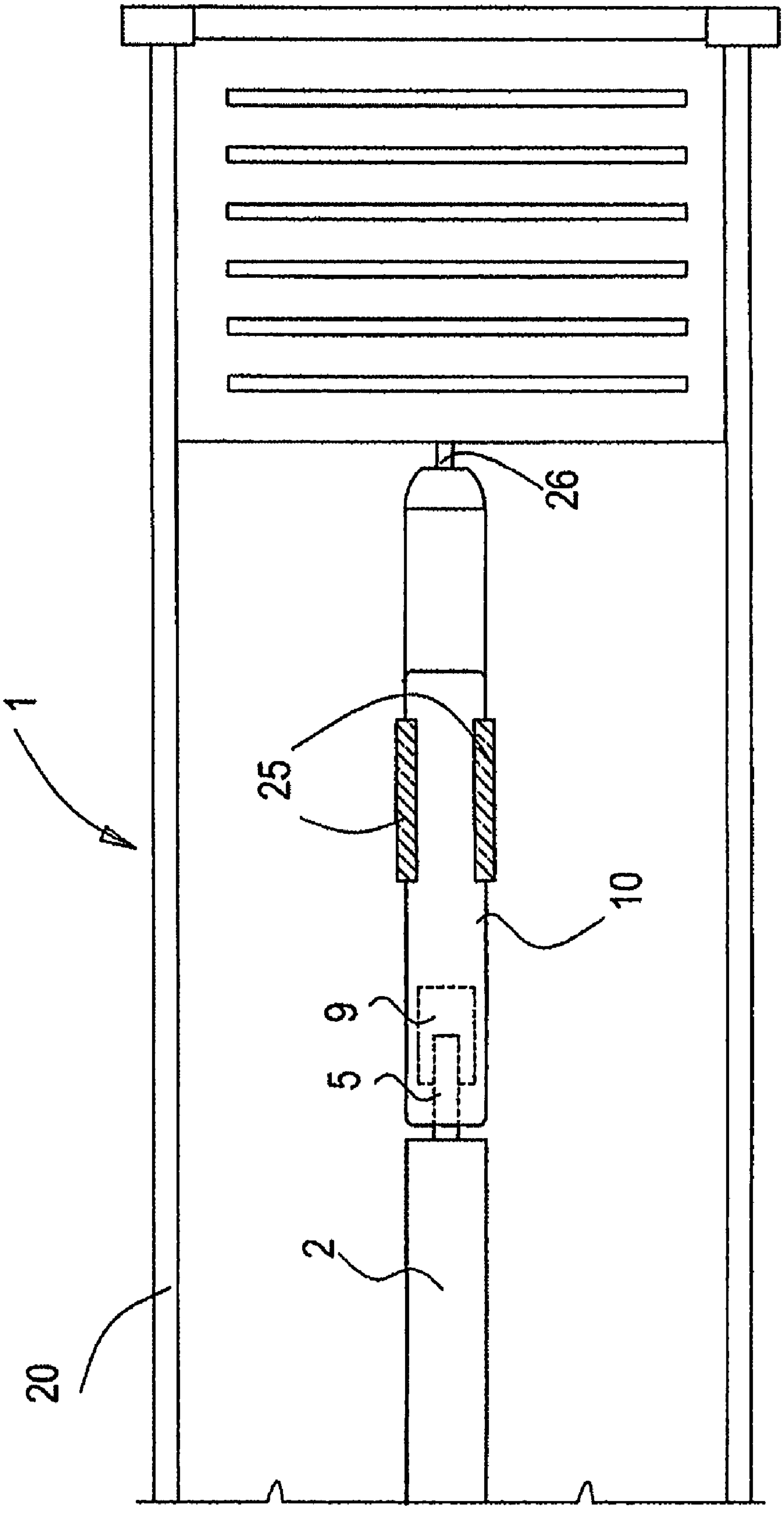
FIG. 7 shows a partial diagrammatic front view of an infrared irradiation device according to the invention.

As shown better in FIG. 7, elastic connecting forks 25 fix the infrared bulb 2 to the lamp-holder 20, gripping both ends of said bulb by means of the sheath 10 thus to form the device 1 according to the present invention. The sheath 10, through the characteristics of the silicone material of which it is made, fulfils the dual function of ensuring the water-tightness of the connector element assembly, as described above, and of allowing an elastic fixing of the infrared bulb 2 to the lamp-holder 20 so as to absorb the vibrations and the small knocks that occur in daily use.

Of course, the sheath 10 can be shaped differently from what is illustrated in the figures, also according to the type of terminal connector of the bulb, the sealing action it exerts on said connector remaining unchanged.

Numerous changes and modifications of detail within the reach of a person skilled in the art can be made to the present embodiment of the invention without thereby departing from the scope of the invention, as set forth in the appended claims.

The invention claimed is:

1. An infrared irradiating device (1) comprising:

a lamp-holder (20) of a material adapted to withstand the thermal and mechanical stresses to which it is exposed in conditions of use and adapted to house an irradiating system;

an infrared bulb (2) inserted in the lamp-holder (20) and adapted to produce radiations in the infrared wavelength, said bulb (2) having two ends (5);

connector elements (15) at each end (5) of said infrared bulb (2) removably connected to complementary connector elements (14), which carry an electrical supply cable (26) to form a connector element assembly (21), characterized in that the device (1) further comprises a sheath (10) enclosing and protecting said connector element assembly (21) at each end of the bulb (2) from infiltrations of water and from other external agents, said sheaths (10) being composed of a silicone elastomer capable of withstanding temperatures up to 400° C. and being removably fitted on each end (5) of the bulb (2) to elastically support the bulb (2) in the lamp-holder (20);

said bulb (2) comprising a filament (4) extending from one end to the other of said bulb (2) so that said bulb (2) has a heated surface throughout the length thereof.

2. An infrared irradiating device (1) according to claim 1 characterised in that said sheath (10) comprises a cylindrical portion (10') having an axial circular channel (24) and a channel narrowing (24') adapted to ensure a tight seal on the electrical supply cable (26).

3. An infrared irradiating device (1) according to claim 1, characterised in that said sheath (10) comprises a substantially rectangular portion (10") having an axial channel (24") rectangular in section, adapted to ensure the water-tightness for the connector element assembly by fitting for a length thereof on a flat end portion (5) of the infrared bulb (2).

4. An infrared irradiating device (1) according to claim 1, characterised in that said sheath (10) is adapted to be coupled to connection means (25) integral with the lamp-holder (20) to allow the housing and the support of the infrared bulb (2) by providing an elastic type fixing such as to allow the absorption of vibrations and/or of the small knocks due to the outdoor environment.

5. An infrared irradiating device (1) according to claim 1, characterised in that said silicone elastomer consists of a silicone material called MG7203N40.

6. An infrared irradiating device (1) according to claim 1, characterised in that said connector element assembly (21) comprises: a cylinder of ceramic material (9), connected by means of heat welding to the ends (5) of the infrared bulb (2); an electric cable (11) connected to said cylinder (9) of ceramic material; a cable terminal (15), fixed firmly to said electric cable (11), adapted to be connected through the complementary connector elements (14) to the supply cable (26).

7. An infrared irradiating device (1) according to claim 1, characterised in that said connector element assembly (21) comprises a cable terminal (15) partially embedded in the ends (5) of the glass tube (3) of the infrared bulb (2) and connector elements (14) complementary to said cable terminal (15).

8. An infrared irradiating device (1) according to claim 1, characterised in that said connector element assembly (21) comprises a metal rod (6) protruding from each end (5) of the glass tube (3) of the infrared bulb (2) for its connection to the supply cable (26).

9. An infrared irradiating device (1) according to claim 1, characterised in that said cable terminal (15) is a male faston-type terminal and said complementary cable terminal (14) is a female faston-type terminal adapted to be connected to the male faston (15) or vice versa.

* * * * *